3,293,190
METHOD FOR MODIFYING THE ELECTRICAL AND CATALYTIC PROPERTIES OF A SUPPORTED CATALYST
James T. Richardson, Baytown, Tex., assignor, by mesne assignments, to Esso Research and Engineering Company, Elizabeth, N.J., a corporation of Delaware
No Drawing. Filed Nov. 20, 1963, Ser. No. 325,144
2 Claims. (Cl. 252—301.1)

This invention relates to supported catalysts. More particularly, this invention is an improved method of modifying the electrical and catalytic properties of a supported catalyst including semiconducting compounds.

The electrical and catalytic properties of supported catalysts may be modified by the addition of small amounts of foreign atoms into the crystal lattices. The addition of foreign atoms into a supported catalyst including semiconducting compounds can change the magnetic susceptibility, the electrical conductivity, and the thermal E.M.F. of the supported catalyst. The addition of the foreign atoms also provides a catalytic material which shows superior catalyst activity for certain processes.

The usual procedure for introducing the foreign atoms into the crystal lattices is to chemically or mechanically mix the constituents. The mixture is then heat-treated at a high temperature to insure complete homogeneity. However, the high temperature must be above the Tamm temperature of the host material. The Tamm temperature is that temperature at which atoms in a solid have sufficient mobility to diffuse throughout the crystal. This temperature is approximately one-half to one-third the melting point of the host material. For example, $Al_2O_3$ melts at approximately 2050° C. Therefore, to introduce the foreign atoms into the crystal lattices, the material must be heated to a temperature within the range of 700° C. to 1000° C.

At such a high temperature, the catalyst material may become sintered and fused, thus decreasing the surface area. The catalytic activity of a catalyst is usually decreased with a decreased surface area. Therefore, it is highly desirable that a method for introducing foreign atoms into crystal lattices be provided which uses a temperature below the fusion temperature of the catalyst material. This invention provides such a method.

Briefly described, this new method of modifying the electrical and catalytic properties of a supported catalyst including semiconducting compounds includes the step of providing the crystal lattices of the supported catalyst with a radioactive isotope which, upon decay, will form the desired modifying material. The radioactive isotope may be added directly during the formation of the constituents of the supported catalyst. As an alternative, the radioactive isotope may be formed by neutron irradiation. The thus-formed radioactive isotope decays to provide the desired modifying material.

As a result of this new process, the modifying material is homogeneously dispersed throughout the supported catalyst; and no high heat treatment is involved which destroys the surface area.

Using this new method of introducing foreign atoms into the crystal lattices, sulfides, such as NiS, CuS, $MoS_2$, ZnS, and CdS, may be prepared by sulfiding with $H_2S$ containing the radioactive isotope $S^{35}$. The resulting sulfide contains $S^{35}$ homogeneously dispersed throughout the crystal lattices and in concentrations depending on the amount of $S^{35}$ in the $H_2S$ and the conditions of sulfiding. The $S^{35}$ then decays to $Cl^{35}$. The $Cl^{35}$ is the material which modifies the electrical and catalytic properties of the supported catalyst. The $S^{35}$ has a half life of 87 days.

The amount of $S^{35}$ present in the $H_2S$ should range up to 5 percent of the S atoms in the $H_2S$. If more than about 5 percent of the S atoms is $S^{35}$, the crystal lattices may become disrupted. If the foreign atoms in the catalyst are too close together, their orbitals will overlap; and an impurity conduction band will be formed.

The neutron irradiation technique may be used, for example, if the crystal lattices include $V_2O_5$. The neutron irradiation forms $V^{52}$ which decays to form $Cr^{52}$ yielding $V_2O_5$ modified with $Cr^{52}$. The $V^{52}$ decays into $Cr^{52}$ with the emission of beta particles in approximately 3.76 minutes. The neutron flux should be at least $10^{11}$ neutrons cm.$^{-2}$ sec.$^{-1}$. Up to 5 percent of the V in the $V_2O_5$ should be converted into $V^{52}$.

This new technique of modifying the electrical and catalytic properties of a supported catalyst may also be used to modify the electrical and catalytic properties of the material used to support the catalyst. For example, alumina, which is a catalyst supporting material, may be irradiated with neutrons. A predetermined amount of radioactive sodium is thus provided in accordance with the formulas:

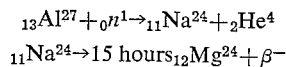

$$_{13}Al^{27} + {_0}n^1 \rightarrow {_{11}}Na^{24} + {_2}He^4$$

$$_{11}Na^{24} \xrightarrow{15\ hours} {_{12}}Mg^{24} + \beta^-$$

The radioactive isotope $Na^{24}$ decays in 15 hours to provide alumina modified by the inclusion of a small amount of magnesium. Up to 5 percent of the aluminum in the alumina should be converted into $Na^{24}$.

It is to be emphasized that the radioactivity of the isotope used to provide the parent material for the modifying material is in no way related to the preparation of the modifying material, except that the parent material radioactively decays into the modifying material. It is preferred, therefore, that the radioactivity of the modified supported catalyst be allowed to substantially decay before the modified supported catalyst is used as a catalyst in a process. For this reason, radioactive isotopes having relatively short half lives are preferred. The half lives of these isotopes should range from 1 second to 500 days.

I claim:
1. A method of modifying the electrical and catalytic properties of a supported catalyst including semiconducting compounds by the addition of a desired modifying material comprising the steps of: at a temperature less than the fusion temperature of the catalyst, introducing into the crystal lattices of the supported catalyst in homogeneous dispersion throughout the crystal lattices, a $S^{35}$ radioactive isotope which upon decay will form the desired modifying material; and allowing the introduced radioactive isotope to decay to form the desired $Cl^{35}$ modifying material.

2. A method of modifying the electrical and catalytic properties of a supported catalyst including semiconducting compounds by the addition of a desired modifying material comprising the steps of:

irradiating a catalyst comprising supported $V_2O_5$ with at least $10^{11}$ neutrons-cm.$^{-2}$-sec.$^{-1}$ for a time sufficient to convert a maximum of 5 percent of the vanadium into $V^{52}$, and allowing substantially all of the $V^{52}$ to decay radioactively to form $Cr^{52}$, yielding a substituted $V_2O_5$ catalyst modified with $Cr^{52}$.

References Cited by the Examiner

UNITED STATES PATENTS

| | | | |
|---|---|---|---|
| 2,279,291 | 4/1942 | Cheney | 252—439 |
| 2,759,895 | 8/1956 | Belmont | 252—62.3 |
| 3,055,842 | 9/1962 | Robinson | 252—464 X |

FOREIGN PATENTS

| | | |
|---|---|---|
| 1,313,990 | 11/1962 | France. |
| 660,719 | 11/1951 | Great Britain. |

OTHER REFERENCES

Chart of Nuclides, Knolls Atomic Power Laboratory, Sixth Edition—2nd Printing.

BENJAMIN R. PADGETT, *Primary Examiner.*

LEON D. ROSDOL, *Examiner.*

A. G. BOWEN, L. A. SEBASTIAN, *Assistant Examiners.*